(12) United States Patent     (10) Patent No.:    US 12,689,963 B2

Hwang                       (45) Date of Patent:       Jul. 21, 2026

---

(54) METHOD AND DEVICE FOR PERFORMING CONDITIONAL HANDOVER IN WIRELESS COMMUNICATION SYSTEM

(71) Applicant: Samsung Electronics Co., Ltd., Suwon-si (KR)

(72) Inventor: June Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 18/448,043

(22) Filed: Aug. 10, 2023

(65) Prior Publication Data

US 2024/0056935 A1     Feb. 15, 2024

(30) Foreign Application Priority Data

Aug. 10, 2022    (KR) ........................ 10-2022-0099774

(51) Int. Cl.
*H04W 36/36*        (2009.01)
(52) U.S. Cl.
CPC ................................. *H04W 36/362* (2023.05)
(58) Field of Classification Search
CPC ......... H04W 36/0094; H04W 36/0069; H04W 36/362
USPC ........................................................ 370/329
See application file for complete search history.

(56) References Cited

U.S. PATENT DOCUMENTS

2021/0258843 A1    8/2021   Awada et al.
2022/0014990 A1*   1/2022   Akl ................... H04W 36/0061

2022/0369172 A1*   11/2022   Hwang ............. H04W 36/0079
2024/0267798 A1*   8/2024   Zhang ................. H04W 36/362
2025/0048190 A1*   2/2025   Liu ................. H04W 36/00835
2025/0048198 A1*   2/2025   Liu ................... H04W 36/0058
2025/0097790 A1*   3/2025   Mochizuki ........... H04W 16/32
2025/0133471 A1*   4/2025   Wang ............. H04W 36/00837
2025/0150927 A1*   5/2025   Song ............. H04W 36/00837
2025/0227565 A1*   7/2025   Xiong ................... H04L 5/0053

(Continued)

FOREIGN PATENT DOCUMENTS

EP           3972338 A1    3/2022
KR   10-2019-0087299 A    7/2019
WO      2021109394 A1    6/2021

(Continued)

OTHER PUBLICATIONS

International Search Report and Written Opinion of the International Searching Authority dated Nov. 24, 2023, in connection with International Application No. PCT/KR2023/011886, 7 pages.

(Continued)

*Primary Examiner* — Robert J Lopata

(57)            ABSTRACT

The disclosure relates to a 5G or 6G communication system for supporting a higher data transmission rate. A method performed by a user equipment (UE) in wireless communication system, the method comprising: receiving, from a source master node (S-MN), a measurement configuration including a first condition for a conditional handover (CHO) and a second condition for a conditional primary secondary cell group cell (PSCell) change (CPC); and in case that the first condition and the second condition are met, performing the CHO to a target master node (T-MN) and the CPC to a target secondary node (T-SN).

20 Claims, 16 Drawing Sheets

(56) References Cited

U.S. PATENT DOCUMENTS

2025/0287283 A1* 9/2025 Bergqvist ............. H04W 36/08

FOREIGN PATENT DOCUMENTS

WO        2022028918  A1    2/2022
WO        2022141470  A1    7/2022

OTHER PUBLICATIONS

Samsung, "(TP to TS37.340 on Mobility Enhancements) Considerations on CHO+CPA/CPC procedure," R3-224834, 3GPP TSG-RAN WG3 Meeting #117-e, Online, Aug. 15-24, 2022, 7 pages.
Zte, "New procedure for support of CHO with CPA feature to TS37.340," R3-224270, 3GPP TSG-RAN WG3 Meeting #117-e, Online, Aug. 15-24, 2022, 2 pages.
Supplementary European Search Report dated Ocober 14, 2025, in connection with European Application No. 23853051.3, 14 pages.
3GPP TS 38.331 V17.1.0 (Jun. 2022), Technical Specification, 3rd Generation Partnership Project; Technical Specification Group Radio Access Network; NR; Radio Resource Control (RRC) protocol specification (Release 17), Jun. 2022, 1273 pages.
Huawei, "Consideration on CHO related aspects," R3-224322, 3GPP TSG-RAN WG2 Meeting #117-3, E-meeting, Aug. 15-24, 2022, 3 pages.
Zte, "Discussion on CHO with CPA," R3-224269, 3GPP TSG-RAN WG3 #117-e, Online, Aug. 15-24, 2022, 3 pages.

* cited by examiner

Structure of transmission of existing CHO with target MCG and target SCG information transmitted to terminal Structure of transmission to terminal of Opt 1

Structure of transmission to terminal of Opt 1

FIG.10A

Structure of transmission to terminal of Opt 2

Structure of transmission to terminal of Opt 2

METHOD AND DEVICE FOR PERFORMING CONDITIONAL HANDOVER IN WIRELESS COMMUNICATION SYSTEM

CROSS-REFERENCE TO RELATED APPLICATION

This application is based on and claims priority under 35 U.S.C. § 119 to Korean Patent Application No. 10-2022-0099774, filed on Aug. 10, 2022, in the Korean Intellectual Property Office, the disclosure of which is herein incorporated by reference in its entirety.

BACKGROUND

1. Field

The present disclosure relates to an operation of a terminal in a wireless communication system. Specifically, the disclosure relates to a method and a device for applying a specific secondary cell group configuration when performing a handover to a specific primary cell in a wireless communication system.

2. Description of Related Art

5$^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broad-bands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

As described above, as a wireless communication system has advanced to provide various services, a method for smoothly providing the services is required. Particularly, a technology for controlling a reference signal to reduce the energy consumption of a base station in a wireless communication system is needed.

The above information is presented as background information only to assist with an understanding of the disclosure. No determination has been made, and no assertion is made, as to whether any of the above might be applicable as prior art with regard to the disclosure.

With the advance of wireless communication systems as described above, various services can be provided, and accordingly there is a need for schemes to effectively provide these services.

The above information is presented as background information only to assist with an understanding of the disclosure. No determination has been made, and no assertion is made, as to whether any of the above might be applicable as prior art with regard to the disclosure.

SUMMARY

Disclosed embodiments provide an apparatus and a method capable of effectively providing a service in a wireless communication system.

According to an embodiment of the disclosure, an operation method of a terminal in a wireless communication system includes receiving, from a source master node, a signal including information on a first condition, information on a second condition, and conditional handover (CHO) configuration information corresponding to each of the conditions, determining whether at least one of the first condition and the second condition is satisfied, based on the received signal, applying CHO configuration information corresponding to a satisfied condition between the first condition and the second condition, based on a result of the determination, and performing random access to a target master node, based on the applied CHO configuration information.

Various embodiments of the disclosure provide an apparatus and a method for effectively providing a service in a wireless communication system.

Effects obtainable from the disclosure are not limited to the above-mentioned effects, and other effects which are not mentioned may be clearly understood by those skilled in the art of the disclosure through the following descriptions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10A illustrates an operation of determining whether each condition among a type 1 condition and a type 2 condition is satisfied, and when an SCG is hierarchically applied, performing a CHO wherein a T-MN determines the type 2 condition, according to an embodiment of the present disclosure;

DETAILED DESCRIPTION

Figure 1:
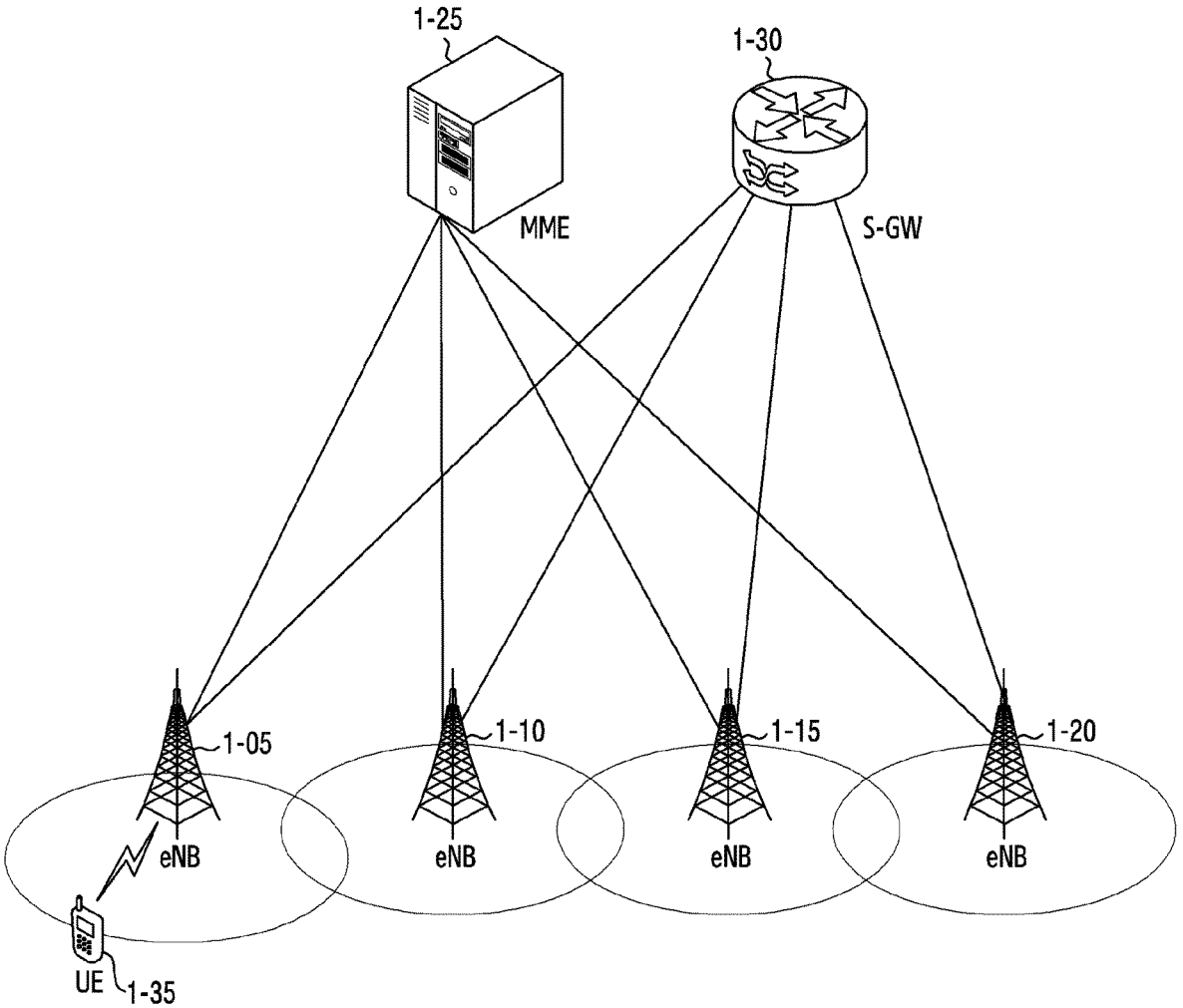
FIG. 1 illustrates a structure of an LTE system related to an embodiment of the present disclosure.

FIGS. 1 through 11B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. In the disclosure, a "downlink (DL)" refers to a radio link via which a base station transmits a signal to a terminal, and an "uplink (UL)" refers to a radio link via which a terminal transmits a signal to a base station. Furthermore, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure. Herein, it will be understood that each block of the flowchart illustrations, and combinations of blocks in the flowchart illustrations, can be implemented by computer program instructions.

These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved. As used in the embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Furthermore, the "unit" in the embodiments may include one or more processors.

The following description of embodiments of the disclosure is mainly directed to New Radio (NR) as a radio access network and Packet Core 5G system or 5G Core Network or Next Generation Core (NG Core) as a core network in the 5G mobile communication standards specified by the 3rd generation partnership project (3GPP) that is a mobile communication standardization group, but based on determinations by those skilled in the art, the main idea of the disclosure may be applied to other communication systems having similar backgrounds through some modifications without significantly departing from the scope of the disclosure. In the following description of disclosure, terms and names defined in the 3GPP standards (standards for 5G, NR, LTE, or similar systems) among the existing communication standards may be used for the sake of descriptive convenience. However, the disclosure is not limited by these terms and names, and may be applied in the same way to systems that conform other standards. In particular, the disclosure may be applied to the 3GPP 5GS/NR (5th generation mobile communication standards).

Furthermore, the disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology. In the disclosure, the term "eNB" may be interchangeably used with the term "gNB." That is, a base station described as "eNB" may indicate "gNB." In addition, the term "terminal" may refer to not only mobile phones, NB-IoT devices, and sensors, but also other wireless communication devices.

A wireless communication system is advancing to a broadband wireless communication system for providing high-speed and high-quality packet data services using communication standards, such as high-speed packet access (HSPA) of 3GPP, LTE (long-term evolution or evolved universal terrestrial radio access (E-UTRA)), LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, may freely reflect various requirements of users, service providers, and the like, services satisfying various requirements may be supported. The services considered in the 5G communication system include enhanced mobile broadband (eMBB) communication, massive machine-type communication (mMTC), ultra-reliability low-latency communication (URLLC), and the like.

According to some embodiments, eMBB aims at providing a data rate higher than that supported by existing LTE, LTE-A, or LTE-Pro. For example, in the 5G communication system, eMBB may provide a peak data rate of 20 Gbps in the downlink and a peak data rate of 10 Gbps in the uplink for a single base station. Furthermore, the 5G communication system may provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6

GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, the Internet of Things may support a large number of UEs (e.g., 1,000, 000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC may be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC may provide communication with ultra-low latency and ultra-high reliability. For example, a service supporting URLLC may satisfy an air interface latency of less than 0.5 ms, and also requires a packet error rate of 10-5 or less. Therefore, for the services supporting URLLC, a 5G system may provide a transmit time interval (TTI) shorter than those of other services, and also may require a design for assigning a large number of resources in a frequency band in order to secure reliability of a communication link.

The above-described three services considered in the 5G communication system, that is, eMBB, URLLC, and mMTC, may be multiplexed and transmitted in a single system. In order to satisfy different requirements of the respective services, different transmission/reception techniques and transmission/reception parameters may be used between the services. However, the above mMTC, URLLC, and eMBB are merely examples of different types of services, and service types to which the disclosure is applied are not limited to the above examples.

Hereinafter, the disclosure provides a device and a method for performing a handover in a wireless communication system. More specifically, various embodiments of the disclosure provide a device and a method for performing a conditional handover (CHO) in a wireless communication system. In various embodiments, the CHO may mean that a terminal selects one target cell from among candidate cells which satisfy a CHO trigger condition, and performs a handover to the selected target cell.

In the disclosure, a master node (MN) may be interpreted as a master base station, and a secondary node (SN) may be interpreted as a secondary base station. In addition, in an embodiment of the disclosure, the MN and the SN may be different base stations or base stations using different radio access technologies (RATs), and in some cases, may be base stations using the same RAT. The MN and the SN may be distinguished by using general expressions such as a first base station and a second base station.

FIG. 1 illustrates a structure of an LTE system related to an embodiment of the present disclosure.

Referring to FIG. 1, as shown in the drawing, a radio access network of an LTE system may include a next-generation base station (an evolved node B, hereinafter, referred to as an eNB, a Node B, or a base station) 1-05, 1-10, 1-15, or 1-20, a mobility management entity (MME) 1-25, and a serving-gateway (S-GW) 1-30. A user equipment (hereinafter, referred to as a UE or a terminal) 1-35 may access an external network via the eNBs 1-05 to 1-20 and the S-GW 1-30.

In FIG. 1, the eNBs 1-05 to 1-20 may correspond to the existing Node B of a UMTS system. The eNB is connected to the UE 1-35 through a wireless channel and may perform a more complex role than the existing Node B. In the LTE system, all user traffic including real-time services such as voice over IP (VoIP) through Internet protocol may be serviced through a shared channel. Therefore, a device for performing scheduling by collecting status information such as a buffer status, an available transmission power status, and a channel status of UEs may be required, and the eNBs 1-05 to 1-20 may be in charge of scheduling. One gNB may generally control multiple cells. For example, in order to implement a transmission rate of 100 Mbps, the LTE system may use orthogonal frequency division multiplexing (OFDM) as a radio access technology in a 20 MHz bandwidth. The disclosure is not limited to the above examples. In addition, the eNBs 1-05 to 1-20 may apply an adaptive modulation and coding (AMC) scheme for determining a modulation scheme and a channel coding rate according to a channel status of a terminal. The S-GW 1-30 is a device for providing a data bearer, and may generate or remove a data bearer according to the control of the MME 1-25. The MME is a device responsible for various control functions as well as a mobility management function for a terminal and may be connected to multiple base stations.

Figure 2:
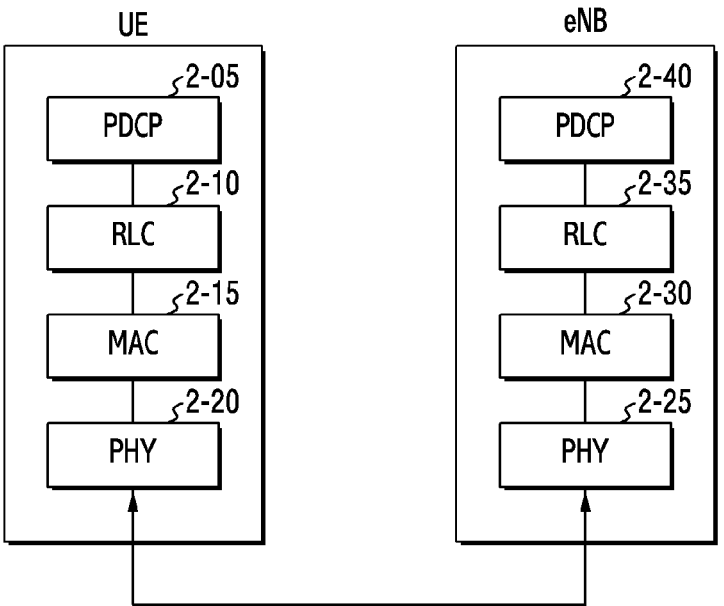
FIG. 2 illustrates a radio protocol structure of an LTE system related to an embodiment of the present disclosure.

FIG. 2 illustrates a radio protocol structure of an LTE system related to an embodiment of the present disclosure.

Referring to FIG. 2, a radio protocol of an LTE system may include packet data convergence protocols (PDCPs) 2-05 and 2-40, radio link controls (RLCs) 2-10 and 2-35, medium access control (MACs) 2-15 and 2-30, and physical (PHY) 2-20 and 2-25 layers in a terminal and an eNB, respectively. The radio protocol of the LTE system may include more or fewer layers than the configuration shown in FIG. 2.

According to an embodiment of the disclosure, the PDCP may be in charge of operations such as IP header compression/restoration. The main functions of the PDCP may be summarized as follows. The disclosure is not limited to the following examples.

Header compression and decompression function (Header compression and decompression: ROHC only).
User data transmission function (Transfer of user data).
In-sequence delivery function (In-sequence delivery of upper layer PDUs at PDCP re-establishment procedure for RLC AM).
Sequence reordering function (For split bearers in DC (only support for RLC AM): PDCP PDU routing for transmission and PDCP PDU reordering for reception).
Duplicate detection function (Duplicate detection of lower layer SDUs at PDCP re-establishment procedure for RLC AM).
Retransmission function (Retransmission of PDCP SDUs at handover and, for split bearers in DC, of PDCP PDUs at PDCP data-recovery procedure, for RLC AM).
Ciphering and deciphering function (Ciphering and deciphering).

Timer-based SDU discard function (Timer-based SDU discard in uplink).

According to an embodiment of the disclosure, the radio link controls (RLCs) 2-10 and 2-35 may perform an ARQ operation by reconfiguring a PDCP packet data unit (PDU) into an appropriate size. The main functions of the RLC may be summarized as follows. The disclosure is not limited to the following examples.

Data transmission function (Transfer of upper layer PDUs).
ARQ function (Error Correction through ARQ (only for AM data transfer)).
Concatenation, segmentation, and reassembly functions (Concatenation, segmentation and reassembly of RLC SDUs (only for UM and AM data transfer)).
Re-segmentation function (Re-segmentation of RLC data PDUs (only for AM data transfer)).
Sequence reordering function (Reordering of RLC data PDUs (only for UM and AM data transfer)).
Duplicate detection function (Duplicate detection (only for UM and AM data transfer)).
Error detection function (Protocol error detection (only for AM data transfer)).
RLC SDU discard function (RLC SDU discard (only for UM and AM data transfer)).
RLC re-establishment function (RLC re-establishment).

According to an embodiment, the MACs 2-15 and 2-30 are connected to several RLC layer devices configured in one terminal and may perform an operation of multiplexing RLC PDUs into a MAC PDU and demultiplexing the RLC PDUs from the MAC PDU. The main functions of the MAC may be summarized as follows. The disclosure is not limited to the following examples.

Mapping function (Mapping between logical channels and transport channels).
Multiplexing and demultiplexing function (Multiplexing/demultiplexing of MAC SDUs belonging to one or different logical channels into/from transport blocks (TB) delivered to/from the physical layer on transport channels).
Scheduling information reporting function (Scheduling information reporting).
HARQ function (Error correction through HARQ).
Priority handling function between logical channels (Priority handling between logical channels of one UE).
Priority handling function between terminals (Priority handling between UEs by means of dynamic scheduling).
MBMS service identification function (MBMS service identification).
Transmission format selection function (Transport format selection).
Padding function (Padding).

According to an embodiment, the PHY layers 2-20 and 2-25 may perform an operation of channel-coding and modulating upper layer data into OFDM symbols to transmit the OFDM symbols via a wireless channel, or an operation of demodulating and channel-decoding OFDM symbols received via a wireless channel to deliver the demodulated and channel-decoded OFDM symbols to an upper layer.

Figure 3:
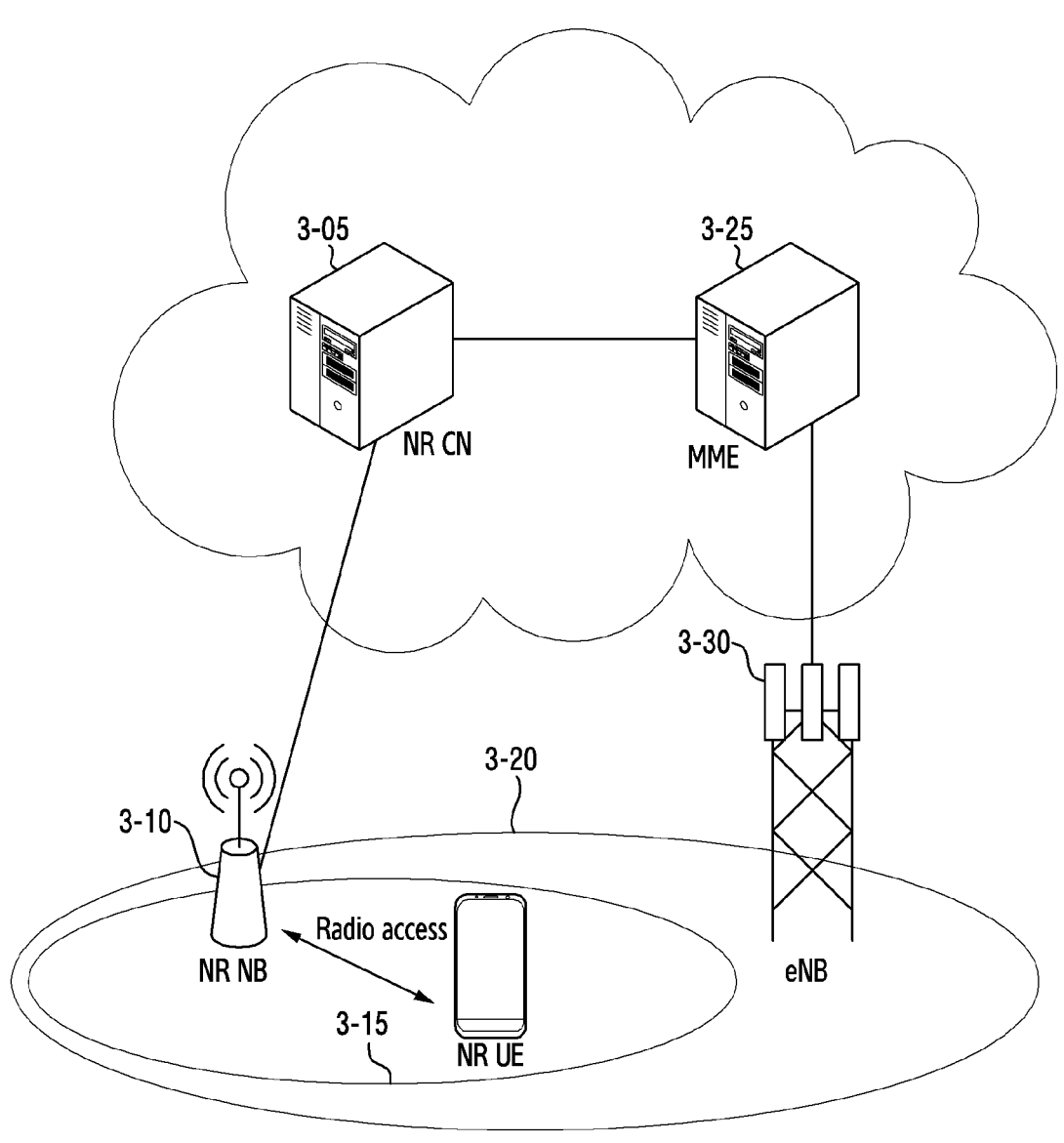
FIG. 3 illustrates a structure of a next-generation mobile communication system according to an embodiment of the present disclosure.

FIG. 3 illustrates a structure of a next-generation mobile communication system according to an embodiment of the present disclosure.

Referring to FIG. 3, a radio access network of a next-generation mobile communication system (hereinafter, referred to as NR or 5G) may include a new radio node B (hereinafter, referred to as an NR gNB or an NR base station) 3-10 and a new radio core network (NR CN) 3-05. A new radio user equipment (an NR UE or a terminal) 3-15 may access an external network via the NR gNB 3-10 and the NR CN 3-05.

In FIG. 3, the NR gNB 3-10 may correspond to an evolved node B (eNB) of the existing LTE system. The NR gNB is connected to the NR UE 3-15 via a wireless channel and may provide a service superior to that of the existing node B. In the next-generation mobile communication system, all user traffic may be serviced via a shared channel. Therefore, a device for performing scheduling by collecting status information such as a buffer status, an available transmission power status, and a channel status of UEs may be required, and the NR NB 3-10 may be in charge of scheduling. One NR gNB may control multiple cells. According to an embodiment of the disclosure, in the next-generation mobile communication system, a bandwidth higher than a general maximum bandwidth may be applied in order to implement high-speed data transmission compared to general LTE.

In addition, according to an embodiment of the disclosure, a beamforming technology may be additionally applied by using an OFDM scheme as a radio access technology. In addition, an adaptive modulation and coding (hereinafter, referred to as AMC) scheme for determining a modulation scheme and a channel coding rate according to a channel status of a terminal may be applied. The NR CN 3-05 may perform functions such as mobility support, bearer configuration, and QoS configuration. The NR CN is a device responsible for various control functions as well as a mobility management function for a terminal, and may be connected to multiple base stations. In addition, the next-generation mobile communication system may be linked with the LTE system, and the NR CN may be connected to an MME 3-25 via a network interface. The MME may be connected to an eNB 3-30, which is an LTE base station.

Figure 4:
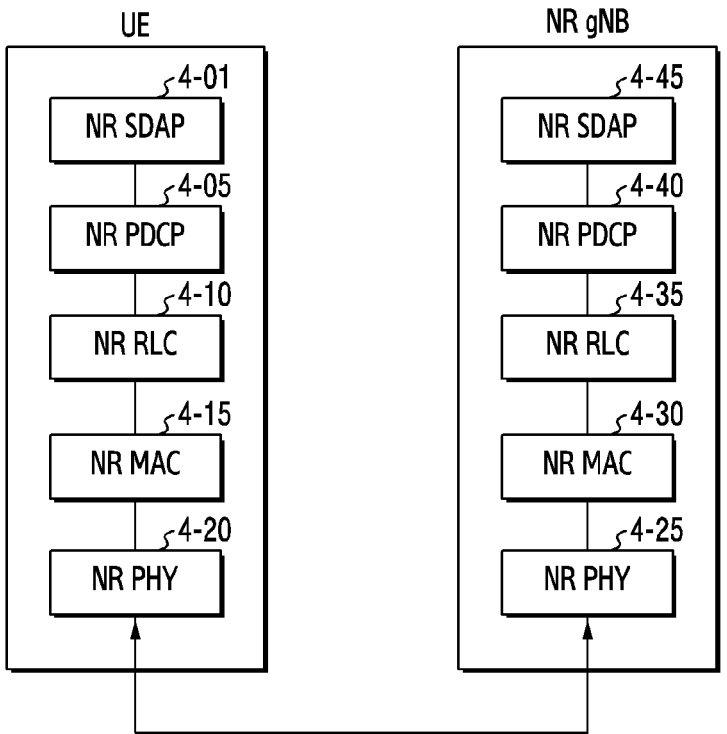
FIG. 4 illustrates a radio protocol structure of a next-generation mobile communication system according to an embodiment of the present disclosure.

FIG. 4 illustrates a radio protocol structure of a next-generation mobile communication system according to an embodiment of the present disclosure.

Referring to FIG. 4, a radio protocol of a next-generation mobile communication system may include NR service data adaptation protocols (SDAPs) 4-01 and 4-45, NR PDCPs 4-05 and 4-40, NR RLCs 4-10 and 4-35, NR MACS 4-15 and 4-30, and NR PHY 4-20 and 4-25 layer devices (hereinafter, interchangeably used with layers and layer devices) in a terminal and an NR base station, respectively. The radio protocol of the next-generation mobile communication system may include more or fewer layers than the configuration shown in FIG. 4.

According to an embodiment of the disclosure, the main functions of the NR SDAPs 4-01 and 4-45 may include some of the following functions. The disclosure is not limited to the following examples.

User data transfer function (transfer of user plane data).

Mapping function of a QoS flow and a data bearer for uplink and downlink (mapping between a QoS flow and a DRB for both DL and UL).

Marking function of a QoS flow ID for uplink and downlink (marking QoS flow ID in both DL and UL packets).

Function of mapping a reflective QoS flow to a data bearer for uplink SDAP PDUs (reflective QoS flow to DRB mapping for the UL SDAP PDUs).

According to an embodiment of the disclosure, with regard to an SDAP layer device, information on whether to use a header of the SDAP layer device or whether to use a function of the SDAP layer device for each PDCP layer device, for each bearer, or for each logical channel may be configured for the terminal through a radio resource control (RRC) message. When an SDAP header is configured, a 1-bit non-access stratum (NAS) quality of service (QoS) reflective configuration indicator (NAS reflective QoS) and a 1-bit access stratum (AS) QoS reflective configuration indicator (AS reflective QoS) of the SDAP header may indicate the terminal to update or reconfigure mapping information relating to a QoS flow and a data bearer for an uplink and a downlink. The SDAP header may include QoS flow ID information indicating QoS. The QoS information may be used as data processing priority, scheduling information, or the like to support a seamless service.

According to an embodiment of the disclosure, the main functions of the NR PDCPs 4-05 and 4-40 may include some of the following functions. The disclosure is not limited to the following examples.

Header compression and decompression function (Header compression and decompression: ROHC only).

User data transmission function (Transfer of user data).

In-sequence delivery function (In-sequence delivery of upper layer PDUs).

Out-of-sequence delivery function (Out-of-sequence delivery of upper layer PDUs).

Sequence reordering function (PDCP PDU reordering for reception).

Duplicate detection function (Duplicate detection of lower layer SDUs).

Retransmission function (Retransmission of PDCP SDUs).

Ciphering and deciphering function (Ciphering and deciphering).

Timer-based SDU discard function (Timer-based SDU discard in uplink).

According to an embodiment of the disclosure, the sequence reordering function (reordering) of an NR PDCP device may refer to a function of sequentially reordering PDCP PDUs, received from a lower layer, based on a PDCP sequence number (SN). The sequence reordering function (reordering) of the NR PDCP device may include a function of delivering data to an upper layer in a reordered sequence, or may include a function of directly delivering data without considering the sequence, may include a function of recording lost PDCP PDUs by reordering the sequence, may include a function of reporting a state of the lost PDCP PDUs to a transmission side, and may include a function of requesting retransmission of the lost PDCP PDUs.

According to an embodiment of the disclosure, the main functions of the NR RLCs 4-10 and 4-35 may include some of the following functions. The disclosure is not limited to the following examples.

Data transmission function (Transfer of upper layer PDUs).

In-sequence delivery function (In-sequence delivery of upper layer PDUs).

Out-of-sequence delivery function (Out-of-sequence delivery of upper layer PDUs).

ARQ function (Error Correction through ARQ).

Concatenation, segmentation, and reassembly functions (Concatenation, segmentation and reassembly of RLC SDUs).

Re-segmentation function (Re-segmentation of RLC data PDUs).

Sequence reordering function (Reordering of RLC data PDUs).

Duplicate detection function (Duplicate detection).

Error detection function (Protocol error detection).

RLC SDU discard function (RLC SDU discard).

RLC re-establishment function (RLC re-establishment).

According to an embodiment of the disclosure, the in-sequence delivery function of an NR RLC device may refer to a function of sequentially delivering RLC SDUs received from a lower layer to an upper layer. The in-sequence delivery function of the NR RLC device may include a function of reassembling and delivering, when an original RLC SDU is segmented into several RLC SDUs and received, the received RLC SDUs.

According to an embodiment of the disclosure, the in-sequence delivery function of the NR RLC device may include a function of reassembling the received RLC PUDs, based on an RLC sequence number (SN) or a PDCP sequence number (SN), may include a function of recording lost RLC PDUs by reordering the sequence, may include a function of reporting a state of the lost RLC PDUs to a transmission side, and may include a function of requesting retransmission of the lost RLC PDUs.

The in-sequence delivery function of the NR RLC device may include at least one of a function of sequentially delivering, when there is a lost RLC SDU, only the RLC SDUs before the lost RLC SDU to an upper layer, a function of sequentially delivering all the RLC SDUs received before a predetermined timer starts to an upper layer if the timer has expired even when there is a lost RLC SDU, and a function of sequentially delivering all the RLC SDUs received until now to an upper layer if a predetermined timer has expired even when there is a lost RLC SDU.

According to an embodiment of the disclosure, the NR RLC device may process RLC PDUs in the order of reception and transmit the processed RLC PDUs to the NR PDCP device regardless of the order of sequence numbers (out of sequence delivery).

According to an embodiment of the disclosure, when a segment is received, the NR RLC device may receive segments stored in a buffer or to be received later, reconfigure the segments into one complete RLC PDU, and transmit the reconfigured segments to the NR PDCP device.

According to an embodiment of the disclosure, an NR RLC layer may not include a concatenation function, and may perform the function in an NR MAC layer or replace the function with a multiplexing function of the NR MAC layer.

According to an embodiment of the disclosure, the out-of-sequence delivery function of the NR RLC device may refer to a function of directly delivering RLC SDUs received from a lower layer to an upper layer regardless of the sequence. The out-of-sequence delivery function of the NR RLC device may include a function of reassembling and delivering, when an original RLC SDU is segmented into several RLC SDUs and received, the received RLC SDUs. The out-of-sequence delivery function of the NR RLC device may include a function of storing RLC SNs or PDCP SNs of received RLC PDUs and reordering the sequence to record lost RLC PDUs.

According to an embodiment of the disclosure, the NR MACs 4-15 and 4-30 may be connected to multiple NR RLC layer devices configured in one terminal, and the main functions of the NR MAC may include some of the following functions. The disclosure is not limited to the following examples.

Mapping function (Mapping between logical channels and transport channels).

Multiplexing and demultiplexing function (Multiplexing/demultiplexing of MAC SDUs).

Scheduling information reporting function (Scheduling information reporting).

HARQ function (Error correction through HARQ).

Priority handling function between logical channels (Priority handling between logical channels of one UE).

Priority handling function between terminals (Priority handling between UEs by means of dynamic scheduling).

MBMS service identification function (MBMS service identification).

Transmission format selection function (Transport format selection).

Padding function (Padding).

According to an embodiment of the disclosure, the NR PHY layers 4-20 and 4-25 may perform an operation of channel-coding and modulating upper layer data into OFDM symbols to transmit the OFDM symbols via a wireless channel, or an operation of demodulating and channel-decoding OFDM symbols received via a wireless channel to deliver the demodulated and channel-decoded OFDM symbols to an upper layer. The disclosure is not limited to the above examples.

Figure 5:
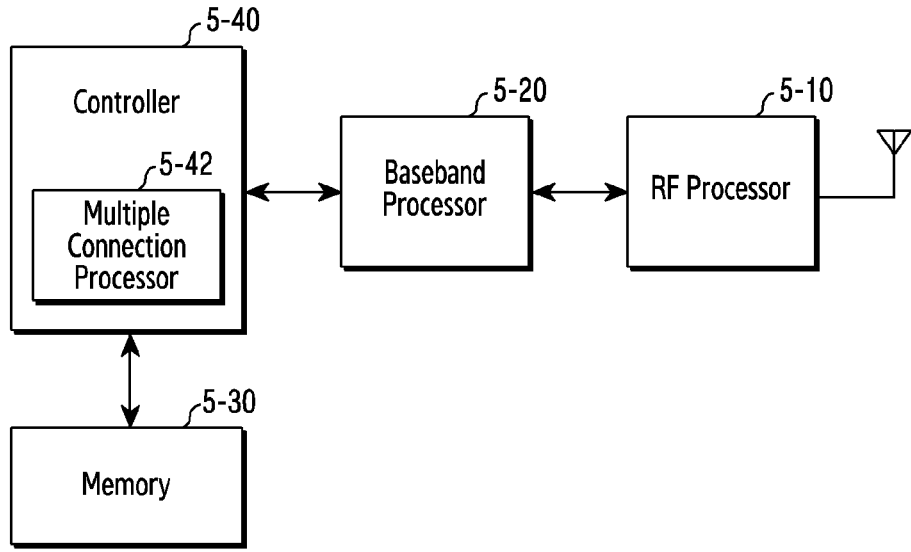
FIG. 5 illustrates a structure of a terminal according to an embodiment of the present disclosure.

FIG. 5 illustrates a structure of a terminal according to an embodiment of the present disclosure.

Referring to FIG. 5, a terminal may include a radio frequency (RF) processor 5-10, a baseband processor 5-20, a memory 5-30, and a controller 5-40. The disclosure is not limited to the example, and the terminal may include more or fewer configurations than the configuration shown in FIG. 5.

According to an embodiment of the disclosure, the RF processor 5-10 may perform a function of transmitting or receiving a signal via a wireless channel, such as band conversion and amplification of the signal. The RF processor 5-10 may up-convert a baseband signal provided from the baseband processor 5-20 into an RF band signal and then transmit the RF band signal via an antenna, and down-convert the RF band signal received via the antenna into baseband signal. For example, the RF processor 5-10 may include a transmission filter, a reception filter, an amplifier, a mixer, an oscillator, a digital to analog convertor (DAC), an analog to digital convertor (ADC), and the like. The disclosure is not limited to the above examples. In FIG. 5, only one antenna is shown, but the terminal may include a plurality of antennas. In addition, the RF processor 5-10 may include a plurality of RF chains. Furthermore, the RF processor 5-10 may perform beamforming. For the beamforming, the RF processor 5-10 may adjust a phase and a size of each of signals transmitted and/or received via the plurality of antennas or antenna elements. In addition, the RF processor may perform multi input multi output (MIMO), and may receive multiple layers when performing an MIMO operation.

According to an embodiment of the disclosure, the baseband processor 5-20 may perform a conversion function between a baseband signal and a bit stream according to a physical layer standard of a system. For example, when data is transmitted, the baseband processor 5-20 may generate complex symbols by encoding and modulating transmission bit streams. In addition, when data is received, the baseband processor 5-20 may demodulate and decode a baseband signal provided from the RF processor 5-10 to restore a reception bit stream. For example, according to an orthogonal frequency division multiplexing (OFDM) scheme, when data is transmitted, the baseband processor 5-20 may generate complex symbols by encoding and modulating transmission bit streams and maps the complex symbols to sub-carriers, and then configure OFDM symbols via an inverse fast Fourier transform (IFFT) operation and a cyclic prefix (CP) insertion. In addition, when data is received, the baseband processor 5-20 may divide a baseband signal provided from the RF processor 5-10 into the units of OFDM symbols and recover the signals mapped to the sub-carriers via a fast Fourier transform (FFT) operation, and then restore a reception bit stream through demodulation and decoding.

According to an embodiment of the disclosure, the baseband processor 5-20 and the RF processor 5-10 may transmit and/or receive a signal as described above. Therefore, the baseband processor 5-20 and the RF processor 5-10 may be referred to as a transmitter, a receiver, a transceiver, or a communicator. Furthermore, at least one of the baseband processor 5-20 and the RF processor 5-10 may include a plurality of communication modules in order to support multiple different radio access technologies. In addition, at least one of the baseband processor 5-20 and the RF processor 5-10 may include different communication modules in order to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.NRHz, NRh) band, and a millimeter wave (e.g., 60 GHz) band. The terminal may transmit or receive a signal to or from a base station by using the baseband processor 5-20 and the RF processor 5-10, and the signal may include control information and data.

According to an embodiment of the disclosure, the memory (or storage) 5-30 may store data such as a basic program, an application program, and configuration information for the operation of the terminal. In particular, the memory 5-30 may store information related to a second access node which performs wireless communication by using a second radio access technology. In addition, the memory 5-30 may provide stored data according to a request of the controller 5-40. In addition, the memory 5-30 may include a plurality of memories. According to another embodiment, the memory 5-30 may store a program for performing a conditional pscell changing method described in this disclosure.

According to an embodiment of the disclosure, the controller 5-40 may control the overall operations of the terminal. For example, the controller 5-40 may transmit and/or receive a signal through the baseband processor 5-20 and the RF processor 5-10. In addition, the controller 5-40 may record and read data on and from the memory 5-30. To record and read data, the controller 5-40 may include at least one processor. For example, the controller 5-40 may include a communication processor (CP) which controls communication and an application processor (AP) which controls an upper layer, such as an application program. In addition, at least one configuration in the terminal may be implemented as a single chip. In addition, according to an embodiment of the disclosure, the controller 5-40 may include a multiple connection processor 5-42 which performs a process for operating in a multiple connection mode.

Figure 6:
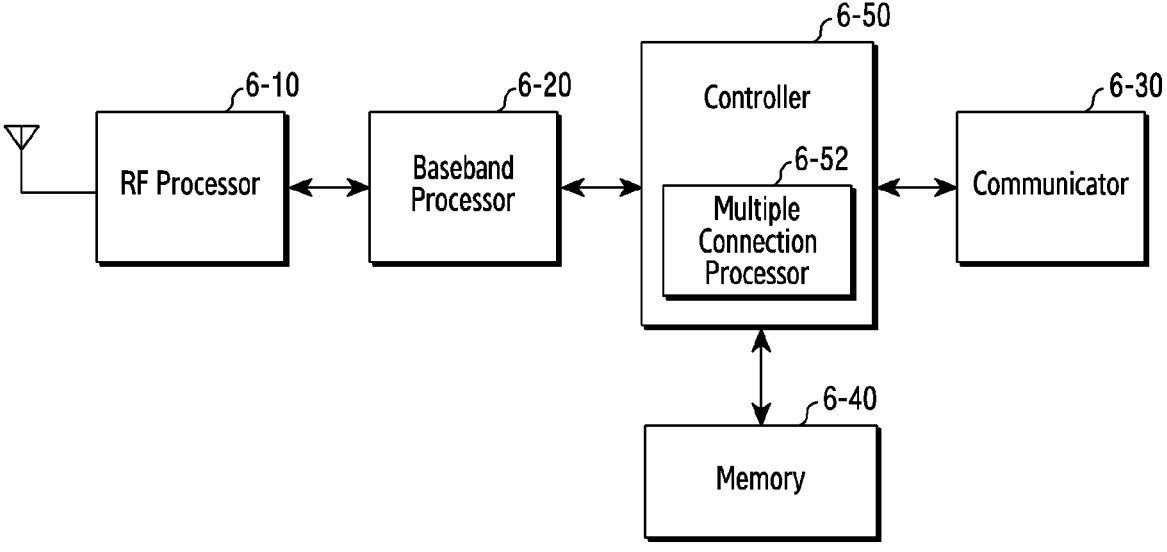
FIG. 6 illustrates a structure of a base station according to an embodiment of the present disclosure.

FIG. 6 illustrates a structure of a base station according to an embodiment of the present disclosure.

Referring to FIG. 6, a base station may include an RF processor 6-10, a baseband processor 6-20, a backhaul communicator 6-30, a memory 6-40, and a controller 6-50. The disclosure is not limited to the above example, and the base station may include more or fewer configurations than the configuration shown in FIG. 6. According to an embodiment of the disclosure, the RF processor 6-10 may perform a function of transmitting and/or receiving a signal via a wireless channel, such as band conversion and amplification of the signal. The RF processor 6-10 may up-convert a baseband signal provided from the baseband processor 6-20 into an RF band signal and then transmit the RF band signal via an antenna, and down-convert the RF band signal received via the antenna into the baseband signal. For example, the RF processor 6-10 may include a transmission filter, a reception filter, an amplifier, a mixer, an oscillator, a DAC, an ADC, and the like. In FIG. 6, only one antenna is shown, but a first access node may include a plurality of antennas. In addition, the RF processor 6-10 may include a plurality of RF chains. Furthermore, the RF processor 6-10 may perform beamforming. For the beamforming, the RF processor 6-10 may adjust a phase and a size of each of signals transmitted and/or received via the plurality of antennas or antenna elements. The RF processor may perform a downlink MIMO operation by transmitting one or more layers.

According to an embodiment of the disclosure, the baseband processor 6-20 may perform a conversion function between a baseband signal and a bit stream according to a physical layer standard of a first radio access technology. For example, when data is transmitted, the baseband processor 6-20 may generate complex symbols by encoding and modulating transmission bit streams. In addition, when data is received, the baseband processor 6-20 may demodulate and decode a baseband signal provided from the RF processor 6-10 to restore a reception bit stream. For example, according to an OFDM scheme, when data is transmitted, the baseband processor 6-20 may generate complex symbols by encoding and modulating transmission bit streams and map the complex symbols to sub-carriers, and then configure OFDM symbols via an IFFT operation and a CP insertion. In addition, when data is received, the baseband processor 6-20 may divide a baseband signal provided from the RF processor 6-10 into the units of OFDM symbols and recover the signals mapped to the sub-carriers through an FFT operation, and then restore a reception bit stream through demodulation and decoding. The baseband processor 6-20 and the RF processor 6-10 may transmit and receive a signal as described above. Accordingly, the baseband processor 6-20 and the RF processor 6-10 may be referred to as a transmitter, a receiver, a transceiver, a communicator, or a wireless communicator.

According to an embodiment of the disclosure, the backhaul communicator 6-30 may provide an interface for performing communication with other nodes in the network. The backhaul communicator 6-30 may convert a bit stream transmitted from a main base station to another node, for example, an auxiliary base station, a core network, etc. into a physical signal, and convert the physical signal received from the other node into a bit stream.

According to an embodiment of the disclosure, the memory (or storage) 6-40 may store data such as a basic program, an application program, and configuration information for the operation of the main base station. In particular, the memory 6-40 may store information on a bearer assigned to an accessed terminal, a measurement result reported from the accessed terminal, and the like. In addition, the memory 6-40 may store information serving as a standard for determining whether to provide multiple connections to the terminal or stop the multiple connections. In addition, the memory 6-40 may provide stored data according to a request of the controller 6-50. In addition, the memory 6-40 may be configured as a storage medium such as a ROM, a RAM, a hard disk, a CD-ROM, and a DVD, or a combination of storage media. In addition, the memory 6-40 may include a plurality of memories. According to some embodiments, the memory 6-40 may store a program for performing a method for allocating an IP address in an IAB system described in this disclosure.

The controller 6-50 may control the overall operations of the base station. For example, the controller 6-50 may transmit and/or receive a signal through the baseband processor 6-20 and the RF processor 6-10 or through the backhaul communicator 6-30. In addition, the controller 6-50 may record and read data on and from the memory 6-40. To this end, the controller 6-50 may include at least one processor. In addition, at least one configuration of the base station may be implemented as a single chip. In addition, the controller 6-50 may control the operation of the base station or an entity corresponding thereto according to various embodiments of the disclosure.

In addition, each configuration of the base station may operate to perform the above-described embodiments of the disclosure.

Hereinafter, terms used in the disclosure are as follows.
SN: secondary node
MN: master node
MCG: master cell group
SCG: secondary cell group
Pcell: primary cell
PScell: Primary SCG (secondary cell group) cell
SCell: secondary cell
SpCell: special cell
CHO: conditional handover
CPC: conditional pscell change
CPAC: conditional pscell addition and change
S-SN: source SN
T-SN: target SN
S-MN: source MN
T-MN: target MN
SNModReq: SN modification required message
SNChangeReq: SN change required message
SNAddReq: SN addition request message
SNAddReqACK: SN addition request acknowledge message
SNModConfirm: SN modification confirm message
SI-CPC: SN-initiated CPCMI-CPC: MN-initiated CPC FIG. 7A illustrates a CHO operation related to an embodiment of the present disclosure.

Figure 7A:
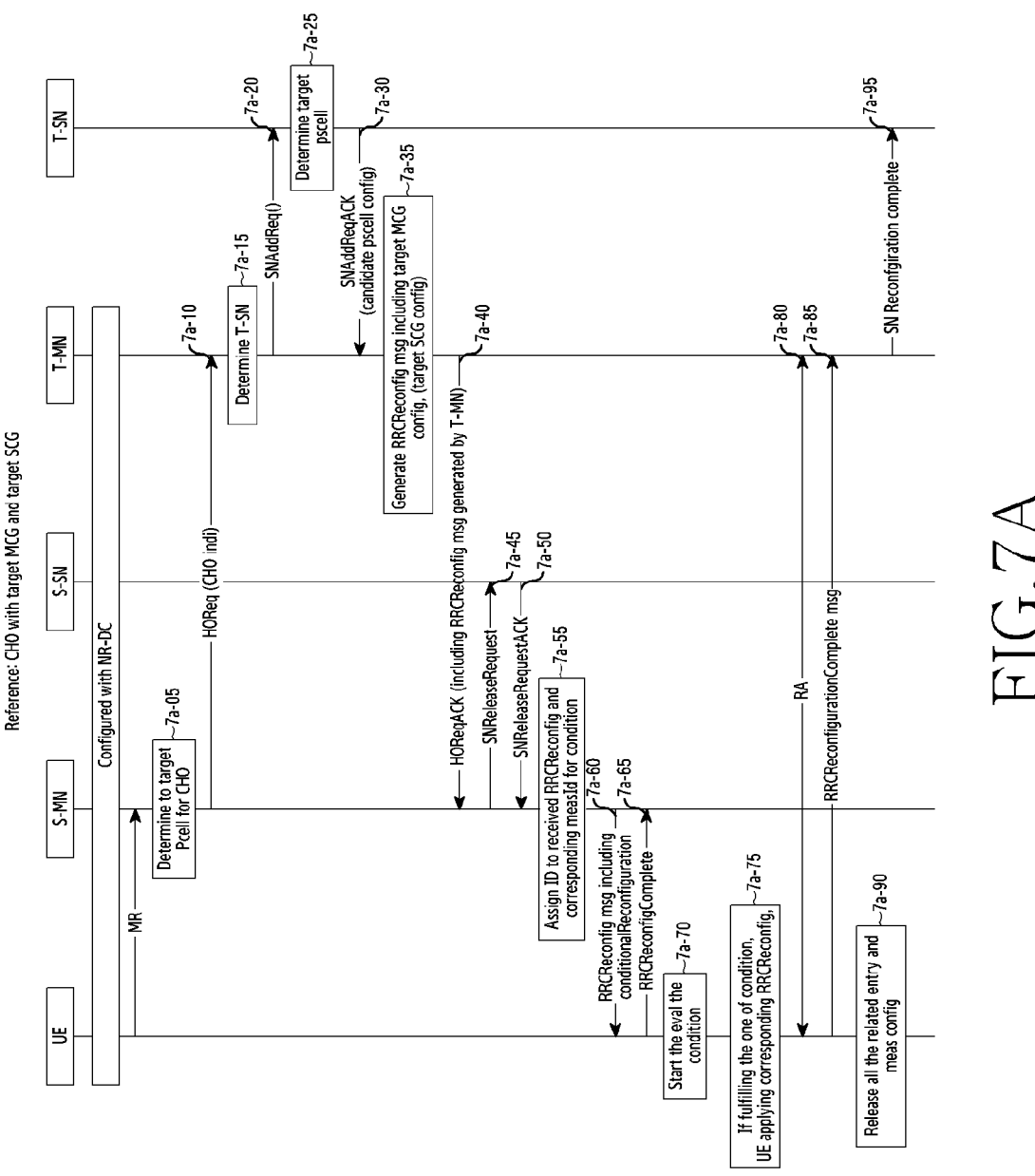
FIG. 7A illustrates a CHO operation related to an embodiment of the present disclosure.

Referring to FIG. 7A, in step 7a-05, when multi-rat dual connectivity (MRDC) is configured for a terminal, an S-MN may determine to perform a CHO and determine a target pcell and a T-MN.

In step 7a-10, the S-MN may transmit, to the T-MN, a HOReq message including target pcell information, an MCG of the terminal, configuration information (for example, SCG and/or MCG configuration information), and a conditional handover indicator.

In steps 7a-15, the T-MN may determine a T-SN.

In step 7a-20, the T-MN may request a resource for the terminal of a target pscell from the determined T-SN through an SNAddReq message.

In step 7a-25, the T-SN may determine the target pscell.

In step 7a-30, the T-SN may transmit resource configuration information of the determined target pscell to the T-MN.

In step 7a-35, the T-MN may make (or generate) an RRCReconfiguration message including target MCG and target SCG configuration information, based on the resource configuration information of the target pscell.

In step 7a-40, the T-MN may transmit a HOReaACK message including the made RRCReconfiguration message to the S-MN.

In step 7a-45, the S-MN having received the HOReaACK message may transmit an SNReleaseRequest message to request release of an existing S-SN.

In step 7a-50, the S-SN having received the SNReleaseRequest message may transmit an SNReleaseRequestACK message to the S-MN in response to receiving the SNReleaseRequest message.

In step 7a-55, the S-MN may connect (or associate) the RRCReconfiguration message received from the T-MN with a specific conditional Reconfiguration Id, and make and associate a condition connected with (or associated with) the received target MCG.

In step 7a-60, the S-MN may make a conditionalReconfiguration field including an id, a condition, and an RRCReconfiguration pair, and may transmit an RRCReconfiguration message including information on a conditionalReconfiguration field to the terminal.

In step 7a-65, the terminal may transmit an RRCReconfiguration completion message to the S-MN.

In step 7a-70, when an RRCReconfiguration message is received, the terminal may start checking (or identifying) the received condition.

In step 7a-75, if a specific condition is satisfied, the terminal may apply target MCG and target SCG configurations connected with (or associated with) the satisfied condition.

In step 7a-80, the terminal may perform a random access (RA) procedure with the T-MN.

In step 7a-85, the terminal may transmit the RRCReconfiguration completion message to the T-MN.

In step 7a-90, after successful application of the MCG and SCG configurations, the terminal may release all entries of a conditionalReconfiguration variable and a measurement Id, report config, and measurement object associated only with a condition for a CHO.

In step 7a-95, the T-MN may transmit an SN Reconfiguration completion message to the T-SN.

Figure 7B:
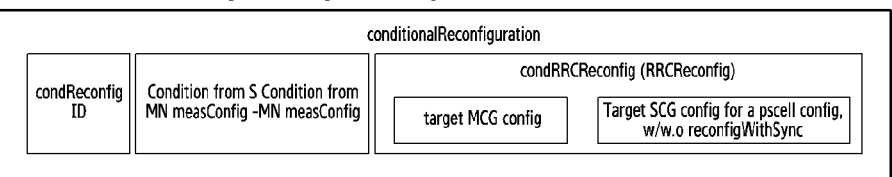
FIG. 7B illustrates a structure of CHO configuration information related to an embodiment of the present disclosure.

FIG. 7B illustrates a structure of CHO configuration information related to an embodiment of the present disclosure.

Referring to FIG. 7B, a structure of CHO configuration information transmitted to a terminal is described. The CHO configuration information (for example, conditionalReconfiguration) may include condReconfig ID, condition from S-MN measConfig, and/or condRRCReconfig(RRCReconfig). In addition, the condRRCReconfig(RRCReconfig) may include target MCG config, target SCG config for a pscell config, and/or w/w.o reconfigWithSync.

In the technique provided below, when measurement configurations related to a signal strength comparison between a source pcell and a candidate pcell are called a type 1 condition, and measurement configurations related to a signal strength comparison between a source pscell and a candidate pscell or a signal strength comparison of only the candidate pscell are called a type 2 condition, a combination of the type 1 and type 2 conditions may be introduced as a performance condition for a conditional handover.

The type 1 and 2 conditions are required to be all included in measurement configuration provided by the S-MN in order to be introduced as the performance condition for the conditional handover, and the S-MN may configure, to the terminal, a measurement operation of configuring the type 1 or 2 condition before instructing the type 1 or 2 condition to the terminal or simultaneously with the instruction. In the case of the type 2 condition, a subject to determine the condition may be the T-MN, S-MN, or T-SN. When the subject to determine the condition is the T-MN or the T-SN, a process of transmitting measurement configuration information related to the condition to the S-MN may be required. When the subject to determine the condition is the T-MN, a detailed description is made with reference to FIG. 8A below. When the subject to determine the condition is the T-SN, a detailed description is made with reference to FIG. 9A below. The S-MN having received the measurement configuration information related to the condition may use the received information to configure a measurement operation associated with the type 2 condition. In addition, the S-MN may make a condition for a specific target MCG of a conditional handover by using the type 1 and type 2 conditions.

A first method may define that the condition for the specific target MCG is satisfied only when both the type 1 condition and the type 2 condition are satisfied. In a second method, both the type 1 condition and the type 2 condition may be checked (or identified), and the case where only the type 1 condition is satisfied at a specific time point and the case where the type 1 condition and the type 2 condition are satisfied may be separately considered in the operation. In particular, when only the type 1 condition is satisfied, the terminal may apply only MCG configuration among connected (or associated) RRCReconfiguration. If both the type 1 condition and the type 2 condition are satisfied, the S-MN may apply all specific target configurations. That is, the S-MN may apply both a target MCG configuration and a target SCG configuration.

Figure 8A:
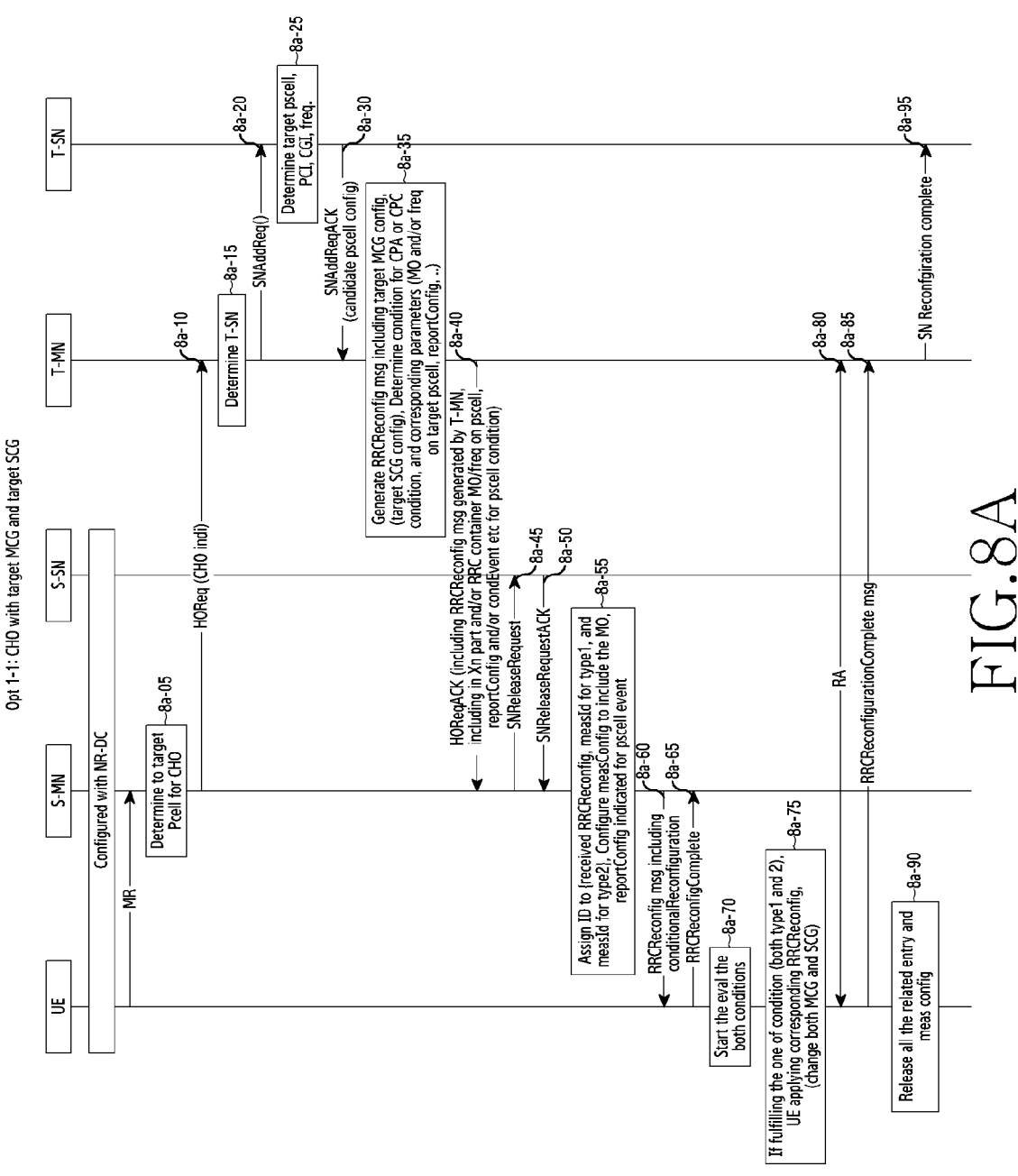
FIG. 8A illustrates an operation of, when both a type 1 condition and a type 2 condition are satisfied, performing a CHO wherein a T-MN determines a type 2 condition, according to an embodiment of the present disclosure.

FIG. 8A illustrates an operation of, when both a type 1 condition and a type 2 condition are satisfied, performing a CHO wherein a T-MN determines a type 2 condition.

Referring to FIG. 8A, in step 8a-05, when MRDC is configured for a terminal, an S-MN may determine to perform a CHO and determine a target pcell and a T-MN.

In step 8a-10, the S-MN may transmit, to the T-MN, a HOReq message including target pcell information, an MCG of the terminal, configuration information (for example, SCG or MCG configuration information), and a conditional handover indicator.

In steps 8a-15, the T-MN may determine a T-SN.

In step 8a-20, the T-MN may request a resource for the terminal of a target pscell from the determined T-SN through an SNAddReq message.

In step 8a-25, the T-SN may determine the target pscell, and determine configuration information. The configuration information may further include at least one of PCI, CGI, and frequency information of the determined pscell as well as target pscell (SCG) information.

In step 8a-30, the T-SN may transmit, to the T-MN, an SNAddReqACK message including the configuration information and target pscell (SCG) information.

In step 8a-35, the T-MN may determine the MCG configuration information by determining the target pcell received from the S-MN. In addition, the T-MN may make (or generate) an RRCReconfiguration message including target SCG configuration information received from the T-SN. In addition, the T-MN may determine a condition for CPA or CPC.

In step 8a-40, the T-MN may transmit, to the S-MN, measurement configuration information for implementing the determined condition for the CPA or CPC. The measurement configuration information may include one or more pieces of the following information.

Information on a frequency where a target pscell exists, and PCI, CGI, report Configuration, conditional event type (condA4 and/or condA3 and/or condA5), offset value, RS type (SSB and/or CSI-RS), and quantity type (RSRQ and/or RSRP and/or RSSI) of the target pscell.

The T_MN may transmit, to an S-SN, a HOReqACK message including a made (or generated) RRCReconfiguration message and measurement configuration information for a condition of the pscell.

In step 8a-45, the S-MN may receive the HOReqACK message and may request SNRelease from the S-SN.

In step 8a-50, when the S-SN receives an SNReleaseRequest message from the S-MN, the S-SN may transmit a response (for example, SNReleaseRequestACK) to the SNReleaseRequest message to the S-MN.

In step 8a-55, the S-MN having received information related to a pscell condition (for example, type 2) may establish a measurement object (MO) corresponding to the condition of the pscell for condition information of the pscell, and make a report configuration to make a measurement Id including the MO and the report configuration. In addition, the S-MN may make a conditional handover condition (for example, type 1) for a target pcell of the T-MN (or a target MCG of the T-MN). The conditional handover condition may be included in measurement configuration information of the S-MN. In addition, the S-MN may determine, as a performance condition for a conditional handover to the target MCG of the T-MN, a condition set obtained by combining a predetermined number of type 1 conditions and a predetermined number of type 2 conditions by a logical operator AND, and may connect (or associate) the performance condition for the conditional handover to the target MCG of the T-MN, a conditional reconfiguration Id, and an RRCReconfiguration received from the T-Mn into one condition.

In step 8a-60, the S-MN may transmit an RRCReconfig message including the information configured in step 8a-55 to the terminal.

In step 8a-65, the terminal may transmit an RRCReconfig completion message to the S-MN in response to the RRCReconfig message.

In step 8a-70, the terminal having received the RRCReconfig message may check (or identify) conditions of a conditional handover.

In step 8a-75, if any one entry condition of type 1 condition and type 2 condition combination sets is satisfied, the terminal may apply target MCG and target SCG configurations connected with (or associated with) the satisfied condition.

In step 8a-80, the terminal may perform an RA procedure with the T-MN.

In step 8a-85, the terminal may transmit an RRCReconfiguration completion message to the T-MN.

In steps 8a-90, if the application of the MCG and SCG configurations is successful, the terminal may delete all conditional handover configuration information in a variable inside the terminal.

In step 8a-95, the T-MN may transmit an SN Reconfiguration completion message to the T-SN.

Figure 8B:
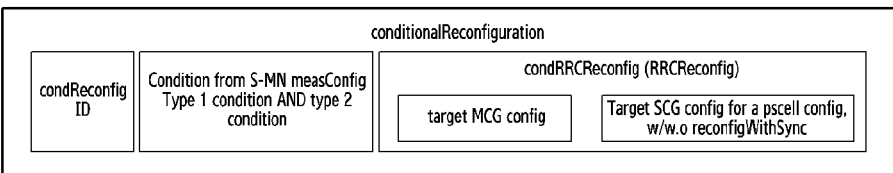
FIG. 8B illustrates a structure of CHO configuration information according to an embodiment of the present disclosure.

FIG. 8B illustrates a structure of CHO configuration information according to an embodiment of the present disclosure.

Referring to FIG. 8B, a structure of CHO configuration information transmitted to a terminal is described. The CHO configuration information (for example, conditionalReconfiguration) may include condReconfig ID, Condition from MN measConfig Type 1 condition AND type 2 condition, and/or condRRCReconfig(RRCReconfig). In addition, the condRRCReconfig(RRCReconfig) may include target MCG config, Target SCG config for a pscell config, and/or w/w.o reconfigWithSync.

Figure 9A:
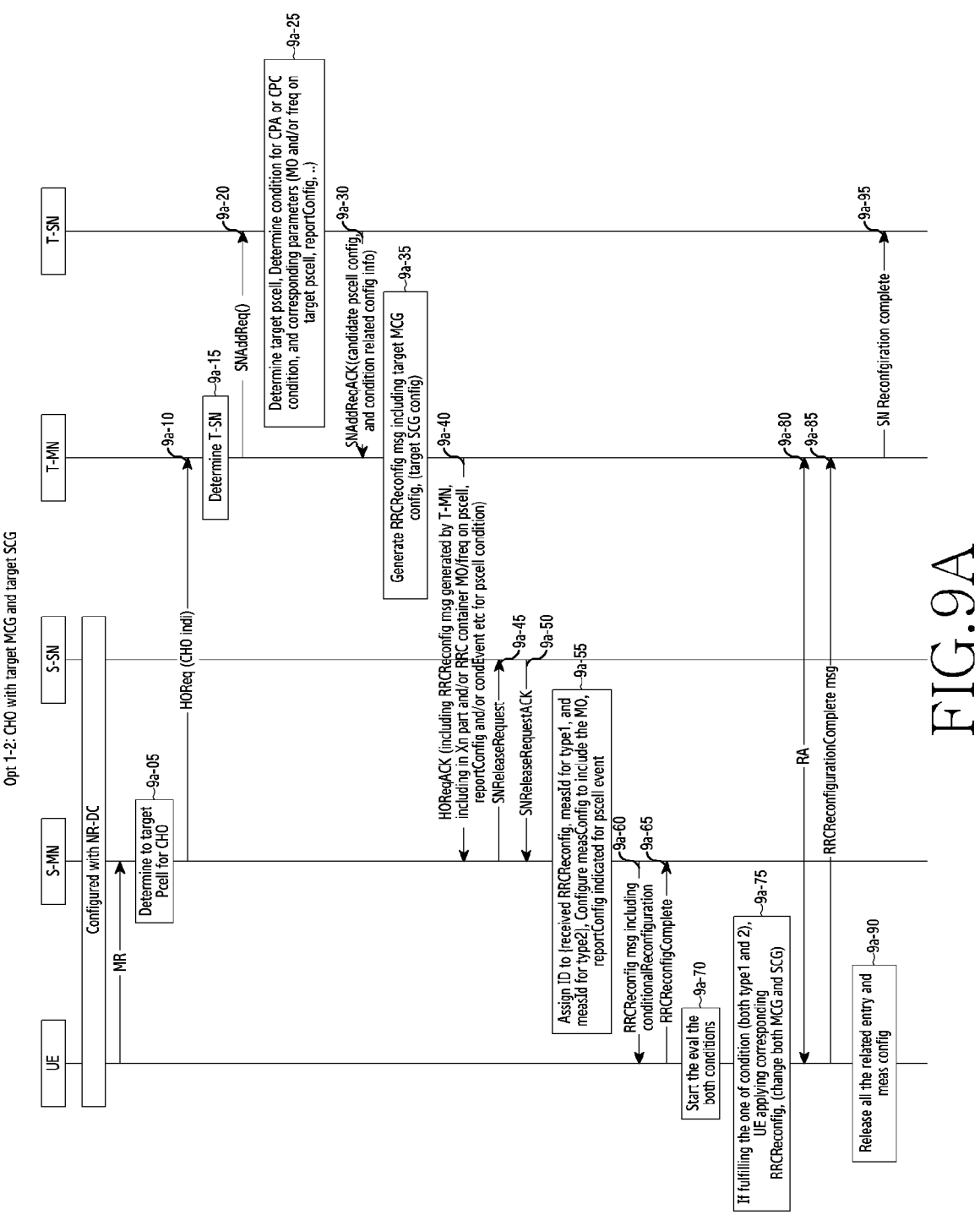
FIG. 9A illustrates an operation of, when both a type 1 condition and a type 2 condition are satisfied, performing a CHO wherein a T-SN determines a type 2 condition, according to an embodiment of the present disclosure.

FIG. 9A illustrates an operation of, when both a type 1 condition and a type 2 condition are satisfied, performing a CHO wherein a T-SN determines a type 2 condition, according to an embodiment of the present disclosure.

Referring to FIG. 9A, in step 9a-05, when MRDC is configured for a terminal, an S-MN may determine to perform a CHO and determine a target pcell and a T-MN.

In step 9a-10, the S-MN may transmit, to the T-MN, a HOReq message including target pcell information, an MCG of the terminal, configuration information (for example, SCG or MCG configuration information), and a conditional handover indicator.

In steps 9a-15, the T-MN may determine a T-SN.

In step 9a-20, the T-MN may request a resource for the terminal of a target pscell from the determined T-SN through an SNAddReq message.

In step 9a-25, the T-SN may determine the target pscell, determine configuration information, and determine a condition for CPA or CPC. In addition, the T-SN may determine a parameter (for example, an MO, a frequency in the target pscell, and/or reportConfig) corresponding to the condition for the CPA or CPC.

In step 9a-30, the T-SN may transmit, to the T-MN, measurement configuration information for implementing the determined condition for the CPA or CPC. The measurement configuration information for implementing the condition for the CPA or CPC may include one or more pieces of the following information.

Information on a frequency where a target pscell exists, and PCI, CGI, report Configuration, conditional event type (condA4 and/or condA3 and/or condA5), offset value, RS type (SSB and/or CSI-RS), and quantity type (RSRQ and/or RSRP and/or RSSI) of the target pscell.

The T-SN may transmit, to the T-MN, an SNAddReqACK message including target pscell (SCG) information and the measurement configuration information for implementing the condition for the CPA or CPC.

In step 9a-35, the T-MN may determine the MCG configuration information by determining the target pcell. In addition, the T-MN may make (or generate) an RRCReconfiguration message including target SCG configuration information received from the T-SN.

In step 9a-40, the T-MN may transmit, to the S-MN, condition information of the target pscell (SCG) received from the T-SN. The T_MN may transmit, to an S-SN, a HOReqACK message including a made (or generated) RRCReconfiguration message and measurement configuration information for a condition of the pscell.

In step 9a-45, the S-MN may receive the HOReqACK message and may request SNRelease from the S-SN.

In step 9a-50, when the S-SN receives an SNReleaseRequest message from the S-MN, the S-SN may transmit a response (for example, SNReleaseRequestACK) to the SNReleaseRequest message to the S-MN.

In step 9a-55, the S-MN having received information related to a pscell condition (for example, type 2) may establish an MO corresponding to condition information of the pscell for the condition information of the pscell, and make a report configuration to make a measurement Id including the MO and the report configuration. In addition, the S-MN may make a conditional handover condition (for example, type 1) for a target pcell of the T-MN (or a target MCG of the T-MN). In addition, the S-MN may determine, as a performance condition for a conditional handover to the target MCG of the T-MN, a condition set obtained by combining a predetermined number of type 1 conditions and a predetermined number of type 2 conditions by a logical operator AND, and may connect (or associate) the performance condition for the conditional handover to the target MCG of the T-MN, a conditional reconfiguration Id, and an RRCReconfiguration received from the T-Mn into one condition.

In step 9a-60, the S-MN may transmit an RRCReconfig message including the information configured in step 9a-55 to the terminal.

In step 9a-65, the terminal may transmit an RRCReconfig completion message to the S-MN in response to the RRCReconfig message. In step 9a-70, the terminal having received the RRCReconfig message may check (or identify) conditions of a conditional handover.

In step 9a-75, if any one condition of type 1 condition and type 2 condition combination sets is satisfied, the terminal may apply target MCG and target SCG configurations connected with (or associated with) the satisfied condition.

In step 9a-80, the terminal may perform an RA procedure with the T-MN.

In step 9a-85, the terminal may transmit an RRCReconfiguration completion message to the T-MN.

In steps 9a-90, if the application of the MCG and SCG configurations is successful, the terminal may delete all conditional handover configuration information in a variable inside the terminal.

In step 9a-95, the T-MN may transmit an SN Reconfiguration completion message to the T-SN.

Figure 9B:
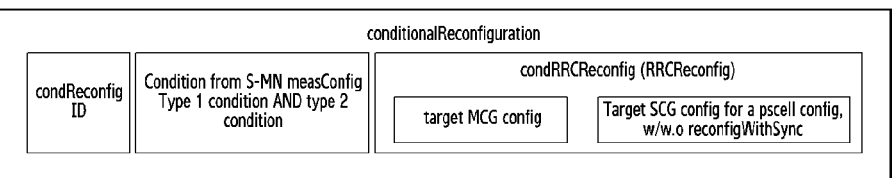
FIG. 9B illustrates a structure of CHO configuration information according to an embodiment of the present disclosure.

FIG. 9B illustrates a structure of CHO configuration information according to an embodiment of the present disclosure.

Referring to FIG. 9B, a structure of CHO configuration information transmitted to a terminal is described. The CHO configuration information (for example, conditionalReconfiguration) may include condReconfig ID, Condition from MN measConfig Type 1 condition AND type 2 condition, and/or condRRCReconfig(RRCReconfig). In addition, the condRRCReconfig(RRCReconfig) may include target MCG config, Target SCG config for a pscell config, and/or w/w.o reconfigWithSync.

Figure 10A:
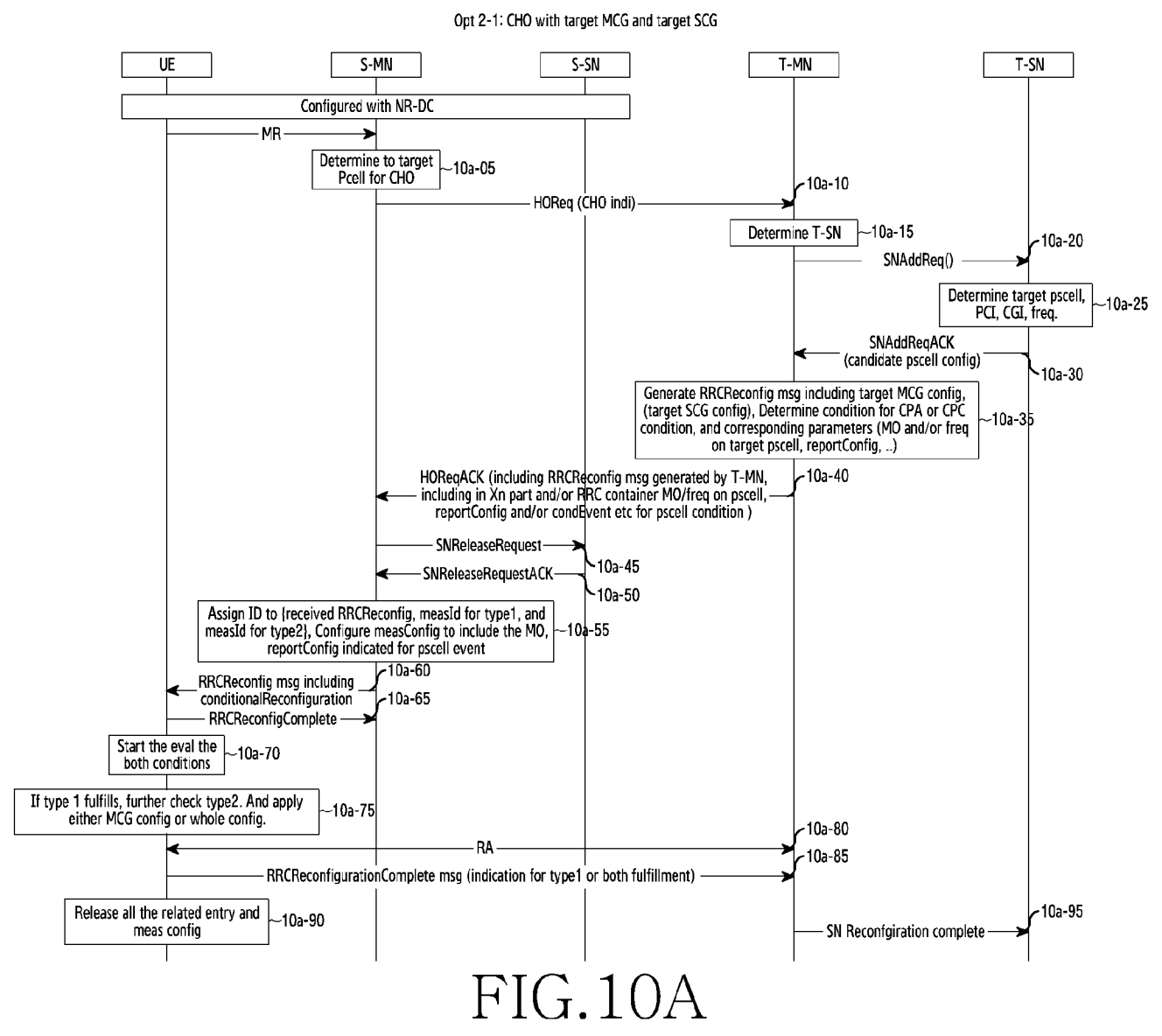

FIG. 10A illustrates an operation of determining whether each condition among a type 1 condition and a type 2 condition is satisfied, and when an SCG is hierarchically applied, performing a CHO wherein a T-MN determines the type 2 condition, according to an embodiment of the disclosure.

Referring to FIG. 10A, in step 10a-05, when MRDC is configured for a terminal, an S-MN may determine to perform a CHO and determine a target pcell and a T-MN.

In step 10a-10, the S-MN may transmit, to the T-MN, a HOReq message including target pcell information, an MCG of the terminal, configuration information (for example, SCG or MCG configuration information), and a conditional handover indicator.

In steps 10a-15, the T-MN may determine a T-SN.

In step 10a-20, the T-MN may request a resource for the terminal of a target pscell from the determined T-SN through an SNAddReq message.

In step 10a-25, the T-SN may determine the target pscell, and determine configuration information.

In step 10a-30, the T-SN may transmit an SNAddReqACK message including the configuration information and target pscell (SCG) information to the T-MN. In addition, the configuration information may include at least one of PCI, CGI, and frequency information of the determined pscell.

In step 10a-35, the T-MN having received the configuration information may determine the MCG configuration information by determining the target pcell. In addition, the T-MN may make (or generate) an RRCReconfiguration message including target SCG configuration information received from the T-SN. In addition, the T-MN may determine a condition for CPA or CPC. In addition, the T-MN may determine a parameter (for example, an MO, a frequency in the target pscell, and/or reportConfig) corresponding to the condition for the CPA or CPC.

In step 10a-40, the T-MN may transmit, to the S-MN, measurement configuration information for implementing the condition for the CPA or CPC. The measurement configuration information for implementing the condition for the CPA or CPC may include one or more pieces of the following information.

Information on a frequency where a target pscell exists, and PCI, CGI, report Configuration, conditional event type (condA4 and/or condA3 and/or condA5), offset value, RS type (SSB and/or CSI-RS), and quantity type (RSRQ and/or RSRP and/or RSSI) of the target pscell.

The T_MN may transmit, to an S-SN, a HOReqACK message including a made RRCReconfiguration message and measurement configuration information for a condition of the pscell.

In step 10a-45, the S-MN may receive the HOReqACK message and may request SNRelease from the S-SN.

In step 10a-50, when the S-SN receives an SNReleaseRequest message from the S-MN, the S-SN may transmit a response (for example, SNReleaseRequestACK) to the SNReleaseRequest message to the S-MN.

In step 10a-55, the S-MN having received information related to a pscell condition (for example, type 2) may establish an MO corresponding to condition information of the pscell for the condition information of the pscell, and make a report configuration to make a measurement ID including the MO and the report configuration. In addition, the S-MN may make a conditional handover condition (for example, type 1) for a target pcell of the T-MN (or a target MCG of the T-MN). In addition, the S-MN may determine a predetermined number of type 1 conditions and a predetermined number of type 2 conditions as a performance condition for a conditional handover to the target MCG of the T-MN through a separate indicator, and may connect (or associate) the performance condition for the conditional handover to the target MCG of the T-MN, a conditional reconfiguration Id, and an RRCReconfiguration received from the T-Mn into one condition.

In step 10a-60, the S-MN may transmit an RRCReconfig message including the information configured in step 10a-55 to the terminal.

In step 10a-65, the terminal may transmit an RRCReconfig completion message to the S-MN in response to the RRCReconfig message.

In step 10a-70, the terminal having received the RRCReconfig message may check (or identify) a condition of a conditional handover.

In step 10a-75, when a type 1 condition is satisfied, the terminal may check (or identify) whether a type 2 condition is satisfied. Depending on whether the type 2 condition is satisfied, the terminal may apply a target MCG configuration when only the type 1 condition is satisfied. Alternatively, the terminal may apply all configurations (for example, target MCG and target SCG configurations) when the type 1 condition and the type 2 condition are satisfied.

In step 10a-80, the terminal may perform an RA procedure with the T-MN.

In step 10a-85, if the application of the type 1 condition or all type conditions (for example, the type 1 condition and type 2 condition) is successful, the terminal may transmit an RRCReconfigurationComplete message to the T-MN. In this case, the RRCReconfigurationComplete message may include an indicator indicating satisfaction of all type conditions (for example, the type 1 condition and the type 2 condition).

In an embodiment, when only all type 1 condition sets are satisfied, the terminal may apply an MCG configuration and other common configurations. In this case, the other common configurations may mean all configurations (for example, measConfig, radio bearer configuration, etc.) except for a mrdc-SCG configuration. In addition, if an SCG is previously configured, the terminal may release the configured SCG. Alternatively, if the SCG is not previously configured, the terminal may not configure a separate SCG. If the MCG application is successful, the terminal may transmit an RRCReconfigurationComplete message to the T-MN. In this case, the RRCReconfigurationComplete message may include an indicator indicating satisfaction of only type 1 or success of only MCG.

In steps 10a-90, if the application of the MCG and SCG configurations is successful, the terminal may delete all conditional handover configuration information in a variable inside the terminal.

In step 10a-95, the T-MN may transmit an SN Reconfiguration completion message to the T-SN.

Figure 10B:
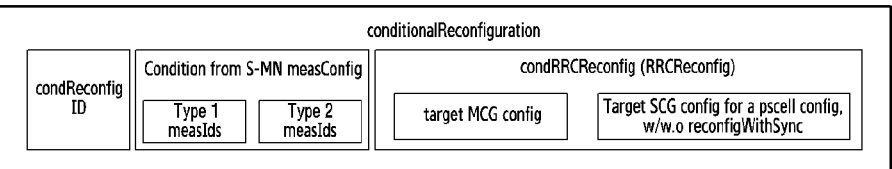
FIG. 10B illustrates a structure of CHO configuration information according to an embodiment of the present disclosure.

FIG. 10B illustrates a structure of CHO configuration information according to an embodiment of the present disclosure.

Referring to FIG. 10B, a structure of CHO configuration information transmitted to a terminal is described. The CHO configuration information (for example, conditionalReconfiguration) may include condReconfig ID, Condition from MN measConfig Type 1 measIds type 2 measIds, and/or condRRCReconfig(RRCReconfig). In addition, the condRRCReconfig(RRCReconfig) may include target MCG config, Target SCG config for a pscell config, and/or w/w.o reconfigWithSync.

Figure 11A:
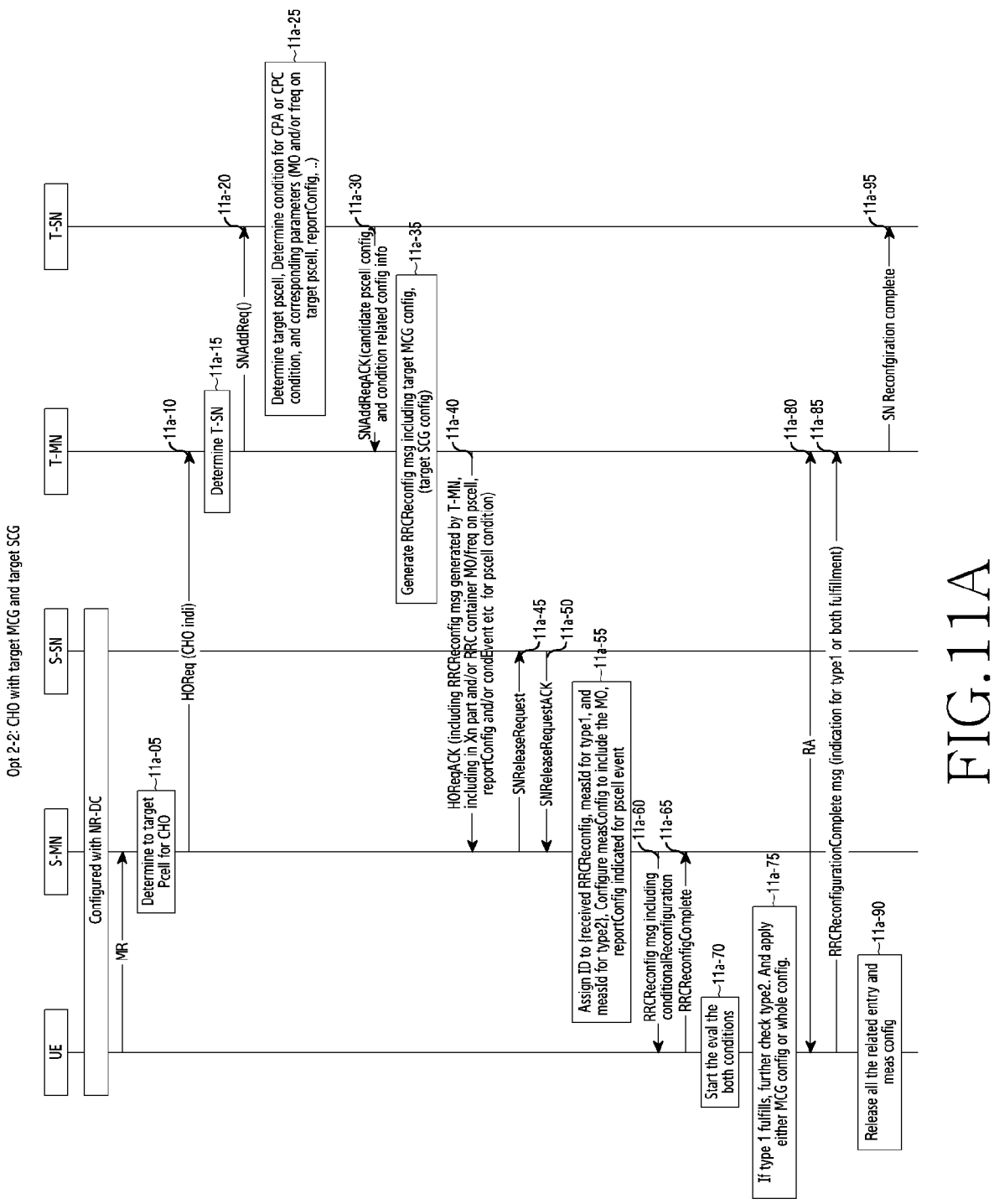
FIG. 11A illustrates an operation of determining whether each condition among a type 1 condition and a type 2 condition is satisfied, and when an SCG is hierarchically applied, performing a CHO wherein a T-SN determines the type 2 condition, according to an embodiment of the present disclosure.

FIG. 11A illustrates an operation of determining whether each type condition among a type 1 condition and a type 2 condition is satisfied, and when an SCG is hierarchically applied, performing a CHO wherein a T-SN determines the type 2 condition, according to an embodiment of the disclosure.

Referring to FIG. 11A, in step 11a-05, when MRDC is configured for a terminal, an S-MN may determine to perform a CHO and determine a target pcell and a T-MN.

In step 11a-10, the S-MN may transmit, to the T-MN, a HOReq message including target pcell information, an MCG of the terminal, configuration information (for example, SCG or MCG configuration information), and a conditional handover indicator.

In steps 11a-15, the T-MN may determine a T-SN.

In step 11a-20, the T-MN may request a resource for the terminal of a target pscell from the determined T-SN through an SNAddReq message.

In step 11a-25, the T-SN may determine the target pscell, determine configuration information, and determine a condition for CPA or CPC. In addition, the T-SN may determine a parameter (for example, an MO, a frequency in the target pscell, and/or reportConfig) corresponding to the condition for the CPA or CPC.

In step 11a-30, the T-SN may transmit, to the T-MN, measurement configuration information for implementing the determined condition for the CPA or CPC. The measurement configuration information for implementing the condition for the CPA or CPC may include one or more pieces of the following information.

Information on a frequency where a target pscell exists, and PCI, CGI, report Configuration, conditional event type (condA4 and/or condA3 and/or condA5), offset value, RS type (SSB and/or CSI-RS), and quantity type (RSRQ and/or RSRP and/or RSSI) of the target pscell The T-SN may transmit, to the T-MN, an SNAddReqACK message including target pscell (SCG) information and the measurement configuration information for implementing the condition for the CPA or CPC.

In step 11a-35, the T-MN may determine the MCG configuration information by determining the target pcell. In addition, the T-MN may make (or generate) an RRCReconfiguration message including target SCG configuration information received from the T-SN.

In step 11a-40, the T-MN may transmit, to the S-MN, condition information of the target pscell (SCG) received from the T-SN. The T_MN may transmit, to an S-SN, a HOReqACK message including a made (or generated) RRCReconfiguration message and measurement configuration information for a condition of the pscell.

In step 11a-45, the S-MN may receive the HOReqACK message and may request SNRelease from the S-SN.

In step 11a-50, when the S-SN receives an SNReleaseRequest message from the S-MN, the S-SN may transmit a response (for example, SNReleaseRequestACK) to the SNReleaseRequest message to the S-MN.

In step 11a-55, the S-MN having received information related to a pscell condition (for example, type 2) may establish an MO corresponding to condition information of the pscell for the condition information of the pscell, and make a report configuration to make a measurement Id including the MO and the report configuration. In addition, the S-MN may make a conditional handover condition (for example, type 1) for a target pcell of the T-MN (or a target MCG of the T-MN). In addition, the S-MN may determine, as a performance condition for a conditional handover to the target MCG of the T-MN, a condition set obtained by combining a predetermined number of type 1 conditions and a predetermined number of type 2 conditions by a logical operator AND, and may connect (or associate) the performance condition for the conditional handover to the target MCG of the T-MN, a conditional reconfiguration Id, and an RRCReconfiguration received from the T-Mn into one condition.

In step 11a-60, the S-MN may transmit an RRCReconfig message including the information configured in step 11a-55 to the terminal.

In step 11a-65, the terminal may transmit an RRCRecon-fig completion message to the S-MN in response to the RRCReconfig message.

In step 11a-70, the terminal having received the RRCReconfig message may check (or identify) a condition of a conditional handover.

In step 11a-75, when a type 1 condition is satisfied, the terminal may check (or identify) whether a type 2 condition is satisfied. Depending on whether the type 2 condition is satisfied, the terminal may apply a target MCG configuration when only the type 1 condition is satisfied. Alternatively, the terminal may apply all configurations (for example, target MCG and target SCG configurations) when the type 1 condition and the type 2 condition are satisfied.

In step 11a-80, the terminal may perform an RA procedure with the T-MN.

In step 11a-85, if the application of the type 1 condition or all type conditions (for example, the type 1 condition and the type 2 condition) is successful, the terminal may transmit an RRCReconfigurationComplete message to the T-MN. In this case, the RRCReconfigurationComplete message may include an indicator indicating satisfaction of all type conditions (for example, the type 1 condition and the type 2 condition).

In an embodiment, when only all type 1 condition sets are satisfied, the terminal may apply an MCG configuration and other common configurations. In this case, the other common configurations may mean all configurations (for example, measConfig, radio bearer configuration, etc.) except for a mrdc-SCG configuration. In addition, if an SCG is previously configured, the terminal may release the configured SCG. Alternatively, if the SCG is not previously configured, the terminal may not configure a separate SCG. If the MCG application is successful, the terminal may transmit an RRCReconfigurationComplete message to the T-MN. In this case, the RRCReconfigurationComplete message may include an indicator indicating satisfaction of only type 1 or success of only MCG.

In steps 11a-90, if the application of the MCG and SCG configurations is successful, the terminal may delete all corresponding conditional handover configuration information in a variable inside the terminal.

In step 11a-95, the T-MN may transmit an SN Reconfiguration completion message to the T-SN.

In an embodiment, when only the type 1 condition is satisfied and the type 2 condition is not satisfied, the terminal may perform one of the following operations after applying the MCG configuration.

1) release type 2 condition configuration information, 2) maintain type 2 condition configuration information, or 3) maintain for a timer.

If the terminal releases the type 2 condition configuration information, the terminal may perform an MN initiated SN addition procedure after applying the MCG configuration. If the terminal maintains the type 2 condition configuration information, the terminal may also maintain a type 2 condition set. Therefore, the terminal may check (or identify) the type 2 condition even after the MCG configuration, and may apply a target SCG if the type 2 condition is satisfied. In the case of using a timer, the T-SN may transmit an SNAddReqACK message to the terminal via the T-MN and the S-MN. The timer may start from a time point when the target SCG configuration information is transmitted to the terminal. When the timer has expired, the terminal may delete type 2 condition-related measurement configuration information and the target SCG configuration information in a variable of the terminal.

Figure 11B:
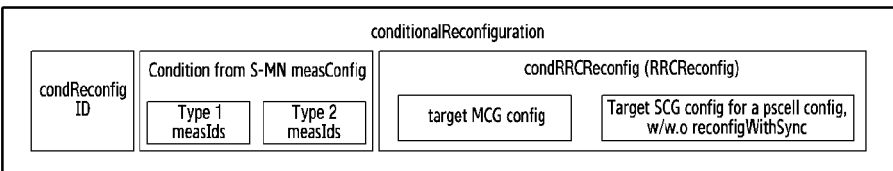
FIG. 11B illustrates a structure of CHO configuration information according to an embodiment of the present disclosure.

FIG. 11B illustrates a structure of CHO configuration information according to an embodiment of the present disclosure.

Referring to FIG. 11B, a structure of CHO configuration information transmitted to a terminal is described. The CHO configuration information (for example, conditionalRecon-figuration) may include condReconfig ID, Condition from MN measConfig Type 1 measIds type 2 measIds, and/or condRRCReconfig(RRCReconfig). In addition, the condRRCReconfig(RRCReconfig) may include target MCG config, Target SCG config for a pscell config, and/or w/w.o reconfigWithSync.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, a digital versatile disc (DVD) or other optical storage device, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the components included in the disclosure are expressed in a singular or plural form. However, the singular or plural expression is appropriately selected according to a provided situation for the convenience of explanation, the disclosure is not limited to a single component or a plurality of components, the components expressed in the plural form may be configured as a single component, and the components expressed in the singular form may be configured as a plurality of components.

Meanwhile, while the specific embodiment has been described in the explanations of the disclosure, it will be noted that various changes may be made therein without departing from the scope of the disclosure. Therefore, the scope of the disclosure is not limited and defined by the described embodiment and is defined not only the scope of the claims as below but also their equivalents.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Furthermore, although the above embodiments have been presented based on the FDD LTE system, other variants based on the technical idea of the above embodiments may also be implemented in other systems such as TDD LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be implemented in combination without departing from the essential spirit and scope of the disclosure.

Various embodiments of the disclosure have been described above. The above description of the disclosure is merely for the sake of illustration, and embodiments of the disclosure are not limited to the embodiments set forth herein. Those skilled in the art will appreciate that the disclosure may be easily modified and changed into other specific forms without departing from the technical idea or essential features of the disclosure. Therefore, the scope of the disclosure should be determined not by the above detailed description but by the appended claims, and all modification sand changes derived from the meaning and scope of the claims and equivalents thereof shall be construed as falling within the scope of the disclosure.

What is claimed is:

1. A method performed by a user equipment (UE) in a wireless communication system, the method comprising:
   receiving, from a source master node, configuration information including a first configuration of a candidate target primary cell (PCell), a second configuration of a candidate target primary secondary cell group cell (PSCell), a first execution condition for a conditional handover (CHO), and a second execution condition for a conditional PSCell change (CPC); and
   in case that the first execution condition and the second execution condition are met, applying the first configuration of the candidate target PCell and the second configuration of the candidate target PSCell.

2. The method of claim 1,
   wherein the first execution condition is associated with a first measurement configuration identity (measId), and
   wherein the second execution condition is associated with a second measurement configuration identity (measId).

3. The method of claim 1, wherein the second execution condition identified by a candidate target master node associated with the candidate target PCell.

4. The method of claim 1, wherein the configuration information is based on a handover request acknowledge message transmitted from a candidate target master node to the source master node, the handover request acknowledge message including a cell global identity (CGI) of the candidate target PSCell and a report configuration.

5. A method performed by a source master node in a wireless communication system, the method comprising:
   transmitting, to a candidate target master node, a handover request message;
   receiving, from the candidate target master node, a handover request acknowledge message including a first configuration of a candidate target primary cell (PCell), a second configuration of a candidate target primary secondary cell group cell (PSCell), and a second execution condition for a conditional PSCell change (CPC); and transmitting, to user equipment (UE), configuration information including the first configuration of the candidate target PCell, the second configuration of the candidate target PSCell, a first execution condition for a conditional handover (CHO) and the second execution condition for the CPC, wherein the first configuration of the candidate target PCell and the second configuration of the candidate target PSCell are applied, in case that the first execution condition and the second execution condition are met.

6. The method of claim 5,
wherein the first execution condition is associated with a first measurement configuration identity (measId), and
wherein the second execution condition is associated with a second measurement configuration identity (measId).

7. The method of claim 5, wherein the second execution condition is identified by a candidate target master node associated with the candidate target PCell.

8. The method of claim 5, wherein the handover request acknowledge message includes a cell global identity (CGI) of the candidate target PSCell and a report configuration.

9. A user equipment (UE) in a wireless communication system, the UE comprising:
at least one transceiver;
at least one processor communicatively coupled to the at least one transceiver; and
at least one memory, communicatively coupled to the at least one processor, storing instructions executable by the at least one processor individually or in any combination to cause the UE to:
receive, from a source master node, configuration information including a first configuration of a candidate target primary cell (PCell), a second configuration of a candidate target primary secondary cell group cell (PSCell), a first execution condition for a conditional handover (CHO), and a second execution condition for a conditional PSCell change (CPC), and
in case that the first execution condition and the second execution condition are met, applying the first configuration of the candidate target PCell and the second configuration of the candidate target PSCell.

10. The UE of claim 9,
wherein the first execution condition is associated with a first measurement configuration identity (measId), and
wherein the second execution condition is associated with a second measurement configuration identity (measId).

11. The UE of claim 9, wherein the second execution condition identified by a candidate target master node associated with the candidate target PCell.

12. The UE of claim 9, wherein the configuration information is based on a handover request acknowledge message transmitted from a candidate target master node to the source master node, the handover request acknowledge message including a cell global identity (CGI) of the candidate target PSCell and a report configuration.

13. A source master node comprising:
at least one transceiver;
at least one processor communicatively coupled to the at least one transceiver; and
at least one memory, communicatively coupled to the at least one processor, storing instructions executable by the at least one processor individually or in any combination to cause the source master node to:
transmit, to a candidate target master node, a handover request message,
receive, from the candidate target master node, a handover request acknowledge message including a first configuration of a candidate target primary cell (PCell), a second configuration of a candidate target primary secondary cell group cell (PSCell), and a second execution condition for a conditional PSCell change (CPC), and
transmit, to user equipment (UE), configuration information including the first configuration of the candidate target PCell, the second configuration of the candidate target PSCell, a first execution condition for a conditional handover (CHO) and the second execution condition for the CPC,
wherein the first configuration of the candidate target PCell and the second configuration of the candidate target PSCell are applied, in case that the first execution condition and the second execution condition are met.

14. The source master node of claim 13,
wherein the first execution condition is associated with a first measurement configuration identity (measId), and
wherein the second execution condition is associated with a second measurement configuration identity (measId).

15. The source master node of claim 13, wherein the second execution condition is identified by a candidate target master node associated with the candidate target PCell.

16. The source master node of claim 13, wherein the handover request acknowledge message includes a cell global identity (CGI) of the candidate target PSCell and a report configuration.

17. The method of claim 2, wherein the first measurement configuration identity (measId) and the second measurement configuration identity (measId) are associated with a master node measurement configuration (measConfig).

18. The method of claim 6, wherein the first measurement configuration identity (measId) and the second measurement configuration identity (measId) are associated with a master node measurement configuration (measConfig).

19. The UE of claim 10, wherein the first measurement configuration identity (measId) and the second measurement configuration identity (measId) are associated with a master node measurement configuration (measConfig).

20. The source master node of claim 14, wherein the first measurement configuration identity (measId) and the second measurement configuration identity (measId) are associated with a master node measurement configuration (measConfig).

* * * * *